United States Patent
Imamura et al.

(10) Patent No.: US 7,287,631 B2
(45) Date of Patent: Oct. 30, 2007

(54) LOCK-UP CONTROL FOR TORQUE CONVERTER

(75) Inventors: Tatsuya Imamura, Machida (JP); Hiroshi Sekiya, Atsugi (JP); Toshiji Iida, Sagamihara (JP); Koji Dohi, Machida (JP); Nobuo Kurogo, Isehara (JP)

(73) Assignees: JATCO Ltd, Shizuoka (JP); Nissan Motor Co., Ltd., Kanagawa (JP)

( * ) Notice: Subject to any disclaimer, the term of this patent is extended or adjusted under 35 U.S.C. 154(b) by 250 days.

(21) Appl. No.: 11/088,264

(22) Filed: Mar. 24, 2005

(65) Prior Publication Data
US 2005/0217957 A1    Oct. 6, 2005

(30) Foreign Application Priority Data
Mar. 31, 2004   (JP) ............................. 2004-103720

(51) Int. Cl.
*F16H 61/14* (2006.01)
(52) U.S. Cl. .................. 192/3.3; 192/3.31; 477/65; 701/67
(58) Field of Classification Search ............... 192/3.31; 477/65, 169, 176; 701/67
See application file for complete search history.

(56) References Cited

U.S. PATENT DOCUMENTS

| 5,332,073 | A | | 7/1994 | Iizuka | |
| 5,609,551 | A | * | 3/1997 | Sakai | 477/168 |
| 5,752,895 | A | | 5/1998 | Sugiyama et al. | |
| 5,947,865 | A | * | 9/1999 | Watanabe et al. | 477/169 |
| 6,139,472 | A | * | 10/2000 | Harada et al. | 477/169 |
| 2002/0019293 | A1 | * | 2/2002 | Noda et al. | 477/169 |
| 2005/0222737 | A1 | | 10/2005 | Imamura et al. | |

FOREIGN PATENT DOCUMENTS

| JP | 08170725 A | * | 7/1996 |
| JP | 11-223263 A | | 8/1999 |

* cited by examiner

*Primary Examiner*—Richard M Lorence
(74) *Attorney, Agent, or Firm*—Foley & Lardner LLP

(57) ABSTRACT

A lock-up clutch control device controls a lock-up clutch provided in a torque converter mounted between an engine and a transmission of a vehicle. The lock-up clutch control device switches between a converter state and a lock-up state by controlling a differential pressure supplied to the lock-up clutch. The lock-up clutch control device has a controller and a differential pressure generator for generating the differential pressure in response to a differential pressure command value. The controller calculates a first differential pressure command value which decreases at a predetermined rate, after the vehicle speed becomes a first predetermined speed; sets the differential pressure command value to a second differential pressure command value, before the vehicle speed becomes a second predetermined speed; and sets the differential pressure command value to a value at which the lock-up clutch is immediately released, when the vehicle speed becomes the second predetermined speed.

10 Claims, 9 Drawing Sheets

LOCK-UP CONTROL FOR TORQUE CONVERTER

FIELD OF THE INVENTION

This invention relates to a control device for controlling lock-up of a torque converter.

BACKGROUND OF THE INVENTION

In a torque converter comprising a lock-up clutch, control of a differential pressure at the front and rear of the lock-up clutch (lock-up differential pressure) engages/disengages the lock-up clutch. The lock-up differential pressure is gradually raised from a predetermined initial differential pressure in order to shift the torque converter from a converter state to a lock-up state. The torque converter is shifted from the converter state to the lock-up state through a slip state. The lock-up clutch is released in the converter state, slips in the slip state, and is engaged in the lock-up state.

Japanese Patent Application Laid-Open No. H11-223263 published by the Japan Patent Office in 1999 discloses control of a lock-up clutch for preventing engine stalling, in which a lock-up clutch is gradually disengaged once the vehicle speed becomes a predetermined vehicle speed during deceleration.

SUMMARY OF THE INVENTION

In this conventional technology, however, when a monitored deceleration of a vehicle exceeds a standard deceleration, the lock-up clutch is released forcibly, whereby the deceleration decreases drastically and a shock is generated.

Further, in coast lock-up cancellation for smoothly releasing the lock-up clutch, a differential pressure command value is gradually reduced at a preset ramp (rate of change) from a vehicle speed at which lock-up cancellation is started, and the lock-up clutch is released completely once a predetermined release vehicle speed is reached. In this case, when setting the ramp by conforming it to a slow deceleration of the vehicle, the vehicle speed reaches the predetermined release vehicle speed during drastic deceleration of the vehicle before even the differential pressure command value decreases sufficiently, whereby a shock associated with release of the lock-up clutch is generated. On the other hand, when setting the ramp by conforming it to the drastic deceleration of the vehicle, the decrease of the differential pressure command value is so drastic during the slow deceleration that a sudden change in the deceleration speed of the vehicle occurs, whereby a shock associated with release of the lock-up clutch is generated.

An object of this invention is to perform lock-up cancellation smoothly regardless of the magnitude of a deceleration of a vehicle.

In order to achieve the above object, this invention provides a lock-up clutch control device which controls a lock-up clutch provided in a torque converter which is mounted between the engine and transmission provided in a vehicle. The lock-up clutch control device switches between a converter state and a lock-up state of the torque converter by controlling a differential pressure supplied to the lock-up clutch. The lock-up clutch control device includes a sensor which detects a vehicle speed; a differential pressure generator which generates the differential pressure supplied to the lock-up clutch in response to a differential pressure command value; and a controller. The controller is programmed to calculate a first differential pressure command value which decreases at a predetermined rate of change, after the detected vehicle speed becomes a first predetermined vehicle speed; calculate a second differential pressure command value which is smaller than the first differential pressure command value; and set the differential pressure command value for the differential pressure generator to the second differential pressure command value, before the detected vehicle speed becomes a second predetermined vehicle speed which is lower than the first predetermined vehicle speed. The controller is further programmed to set the differential pressure command value for the differential pressure generator to a value at which the lock-up clutch is immediately released, when the detected vehicle speed becomes the second predetermined vehicle speed.

Preferably, a differential pressure upper limit, which decreases as the detected vehicle speed decreases, comprises the second differential pressure command value. The controller is preferably programmed to calculate the differential pressure upper limit on the basis of the detected vehicle speed; compare the first differential pressure command value to the differential pressure upper limit; and set the differential pressure command value for the differential pressure generator to the smaller one of the first differential pressure command value and differential pressure upper limit.

The details as well as other features and advantages of this invention are set forth in the remainder of the specification and are shown in the accompanying drawings.

BRIEF DESCRIPTION OF THE DRAWINGS

FIG. 5 shows smooth lock-up cancellation control in a coasting state.

FIG. 6 shows smooth lock-up cancellation control during drastic deceleration.

DESCRIPTION OF THE PREFERRED EMBODIMENTS

Figure 1:
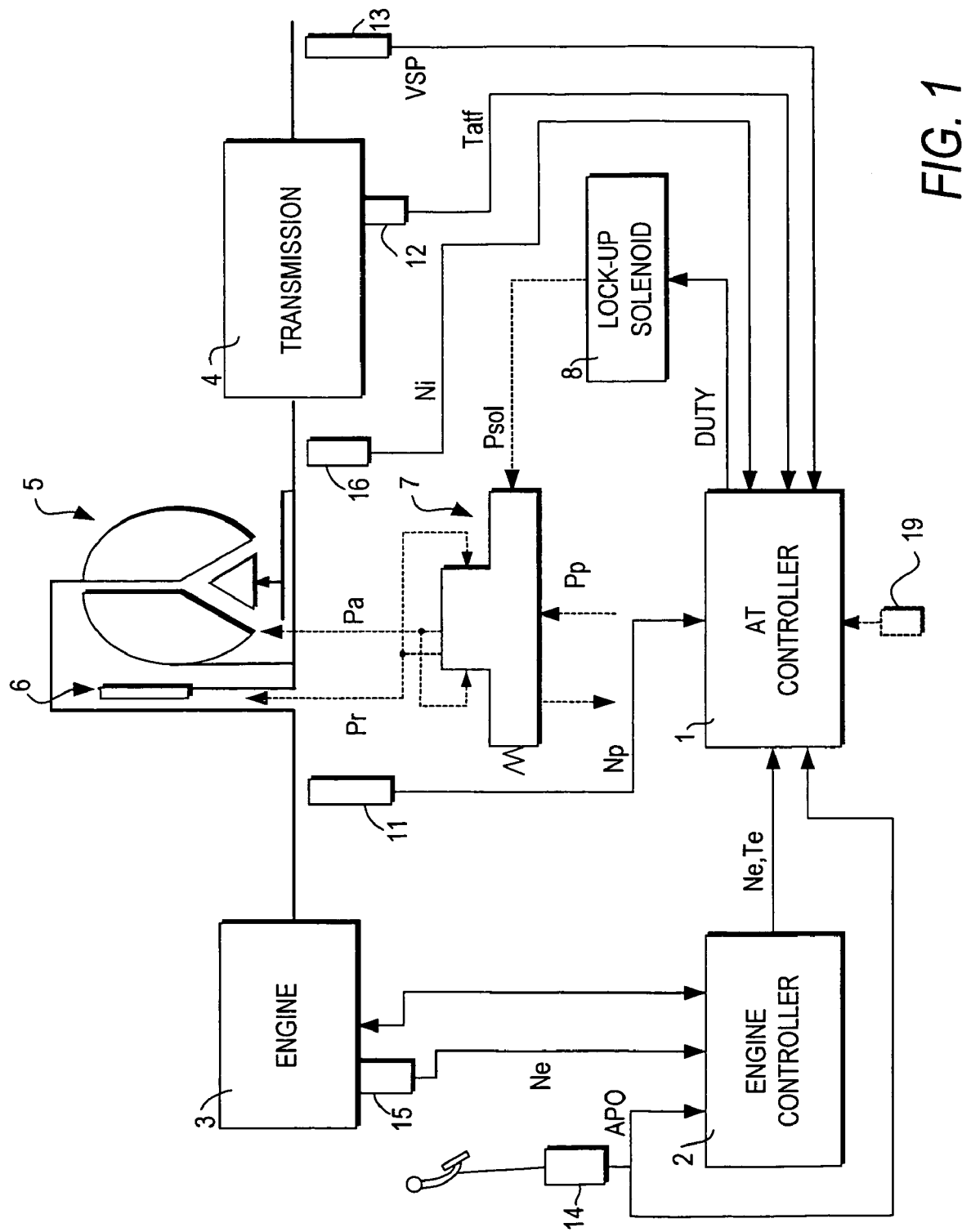
FIG. 1 is a schematic view of a vehicle in which is mounted a control device for an automatic transmission according to the embodiments.

FIG. 1 shows a vehicle in which is mounted an automatic transmission according to this embodiment. An engine 3 is coupled to an automatic transmission comprising a transmission 4 and a torque converter 5. The transmission 4 may comprise one or more planetary gear sets, or a continuously variable transmission (CVT). The torque converter 5 comprises a lock-up clutch 6. The lock-up clutch 6 is selectively brought to a lock-up state (engaged state) or an unlock-up state (disengaged state) in accordance with the operational status of the vehicle.

The torque converter 5 has incorporated therein the lock-up clutch 6 which is rotated along with a torque converter output element (turbine). When the lock-up clutch 6 is locked to a torque converter input element (impeller), the torque converter 5 is brought to the lock-up state where the input and output elements are directly coupled to each other.

The lock-up clutch 6 is operated in accordance with a differential pressure Pa–Pr between a torque converter apply pressure Pa and a torque converter release pressure Pr at the both sides (the front and rear) of the lock-up clutch 6. When the release pressure Pr is higher than the apply pressure Pa, the lock-up clutch 6 is disengaged, thus direct coupling is not made between the torque converter input and output elements. When the release pressure Pr is lower than the apply pressure Pa, the lock-up clutch 6 is locked, and direct coupling is made between the torque converter input and output elements.

When locking the lock-up clutch 6, a locking force, i.e. a lock-up capacity, of the lock-up clutch 6 is determined by the differential pressure Pa–Pr. The larger the differential pressure, the more the locking force of the lock-up clutch 6 increases, thereby increasing the lock-up capacity.

The differential pressure Pa–Pr is controlled by a lock-up control valve 7 which is generally known. The lock-up control valve 7 is, for example, disclosed in U.S. Pat. No. 5,332,073 granted by Iizuka on Jul. 26, 1994, or U.S. Pat. No. 5,752,895 granted by Sugiyama et al. on May 19, 1998.

According to this embodiment, a lock-up solenoid valve 8 uses a pump pressure Pp as the original pressure to create a line pressure Psol applied to the lock-up control valve 7 in response to a duty signal DUTY. In the lock-up control valve 7, the apply pressure Pa and the release pressure Pr act to oppose each other. Further, a biasing force of a spring is added in the same direction as the apply pressure Pa, a biasing force of a spring is added in the same direction as the release pressure Pr, and at the same time the line pressure Psol is applied in the same direction as the release pressure Pr. The lock-up control valve 7 determines the differential pressure Pa–Pr such that these oil pressures and the biasing forces of the springs are balanced. The lock-up solenoid valve 8 and the lock-up control valve 7 constitute a differential pressure generator which generates differential pressure added to the lock-up clutch.

An AT (automatic transmission) controller 1 constituted by a microcomputer and the like determines the duty signal DUTY in accordance with an operational status of the vehicle, and controls the differential pressure Pa–Pr by means of the lock-up solenoid valve 8. The AT controller 1 comprises a microcomputer having a central processing unit (CPU), a random access memory (RAM), a read-only memory (ROM), an input/output (I/O) interface, and a timer. Read-only memory (ROM) may be a programmable ROM.

The AT controller 1 receives signals that indicate a running state of the vehicle and an operational state of the driver. For example, these signals are signals that indicate an input shaft rotational speed Ni of the transmission 4, which is detected by an input shaft rotation sensor 16, a pump impeller rotational speed Np detected by an impeller rotation sensor 11, an accelerator pedal stroke APO (or an opening of a throttle valve TVO) detected by an accelerator pedal stroke sensor 14, an oil temperature Tatf detected by an oil temperature sensor 12, and the vehicle speed VSP detected by a vehicle speed sensor 13. The input shaft of the transmission 4 corresponds to an output shaft of the torque converter 5, and the rotational speed of the input shaft of the transmission 4 is equivalent to the rotational speed of the output shaft of the torque converter 5. The pump impeller rotational speed Np is equivalent to an input rotational speed (=engine speed Ne) inputted to the torque converter 5. Further, the AT controller 1 receives signals indicative of the engine speed Ne and engine torque Te from an engine controller 2. The AT controller 1 controls locking, release, or slippage of the lock-up clutch 6 by means of these signals. The engine speed Ne is detected by an engine speed sensor 15 and is input to the engine controller 2.

The engine controller 2 comprises a microcomputer having a central processing unit (CPU), a random access memory (RAM), a read-only memory (ROM), and an input/output (I/O) interface. The engine controller 2 and the AT controller 1 may be integrated to be a single controller.

The AT controller 1 performs smooth lock-up in accordance with an operational status of the vehicle. Smooth lock-up means locking the lock-up clutch 6 from the converter state through the slip state, and it is performed, for example when variation in the accelerator pedal stroke APO is small and when the vehicle speed VSP is raised gradually.

Based on signals from an inhibitor switch 19 and the like, shift transmission control and lock-up control are performed in an operation range of the transmission that a driver selects. The "operation range of the transmission" here includes a D range (drive range), L range (low-speed range), P range (parking range), and R range (reverse range). The inhibitor switch 19 functions as a sensor which detects the operation range of the transmission.

In the case where the vehicle is in deceleration, such as a coast state, when the vehicle speed drops to a predetermined vehicle speed, an AT controller 1 performs smooth lock-up cancellation control in order to avoid engine stalling. Smooth lock-up cancellation control is to gradually release a lock-up clutch. For example, when an accelerator pedal stroke APO (or an opening of a throttle valve TVO) is zero, and when a vehicle speed VSP decreases to a predetermined value, the lock-up clutch is shifted from a engaged state to a released state via a slip state by the smooth lock-up cancellation control.

Figure 3:
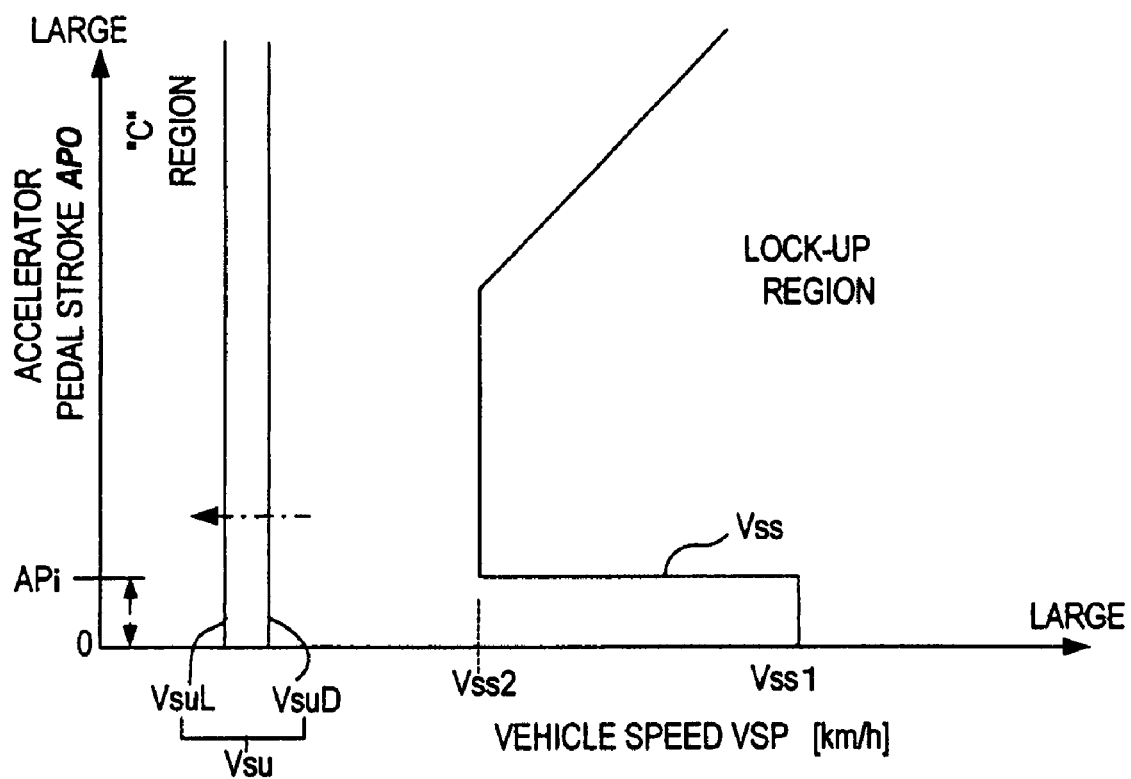
FIG. 3 is a map which sets a lock-up region, slip region, and converter region with respect to a vehicle speed and accelerator pedal stroke. The map sets a smooth lock-up cancellation start vehicle speed with respect to an operation range of the transmission, and sets a lock-up cancellation vehicle speed with respect to the accelerator pedal stroke.

Referring to the map of FIG. 3, there is a lock-up region (region for a lock-up state), slip region (region for the slip state), and converter region (region for the converter state) in accordance with the vehicle speed VSP and the size of the accelerator pedal stroke APO. The lock-up region is a region where the vehicle speed VSP is at least a smooth lock-up cancellation start vehicle speed Vss (first predetermined vehicle speed), and where a lock-up clutch 6 is engaged. The converter region (C region in the figure) is a region where the vehicle speed VSP is less than a lock-up cancellation vehicle speed Vsu (VsuD or VsuL) (second predetermined vehicle speed), and where the lock-up clutch 6 is released. The lock-up clutch 6 is released immediately at the lock-up cancellation vehicle speed Vsu (VsuD or VsuL). Between the lock-up region and converter region is the slip region. The lock-up clutch 6 slips in the slip region.

The lock-up cancellation vehicle speed Vsu (VsuD or VsuL) is a speed that is set in accordance with the operation range of the transmission. VsuD is a lock-up cancellation vehicle speed which is used when the operation range of the transmission is the D range, and VsuL is a lock-up cancellation vehicle speed which is used in the L range.

The smooth lock-up cancellation start vehicle speed Vss changes in accordance with the vehicle speed VSP and the accelerator pedal stroke APO. In the case where APO=⅛, Vss1 is the smooth lock-up cancellation start vehicle speed Vss. The smooth lock-up cancellation start vehicle speed Vss is set to Vss1 at an accelerator pedal stroke APO below ⅛ (or a value Api where an idle switch, which is not shown, is ON). For example, the smooth lock-up cancellation start vehicle speed Vss1 is 20 km/hour.

When the accelerator pedal stroke APO becomes ⅛ or more, the smooth lock-up cancellation start vehicle speed Vss is set to Vss2 (e.g. 15 km/hour), which is less than Vss1. Further, in a region where the accelerator pedal stroke APO is increased to become at least ⅝, the smooth lock-up cancellation start vehicle speed Vss is set so as to be increased gradually from Vss2 to Vss1 in accordance with the vehicle speed VSP. Specifically, in the case where the accelerator pedal stroke APO is at least ⅝, the larger the accelerator pedal stroke APO is, the more the smooth lock-up cancellation start vehicle speed Vss becomes.

Figure 2:
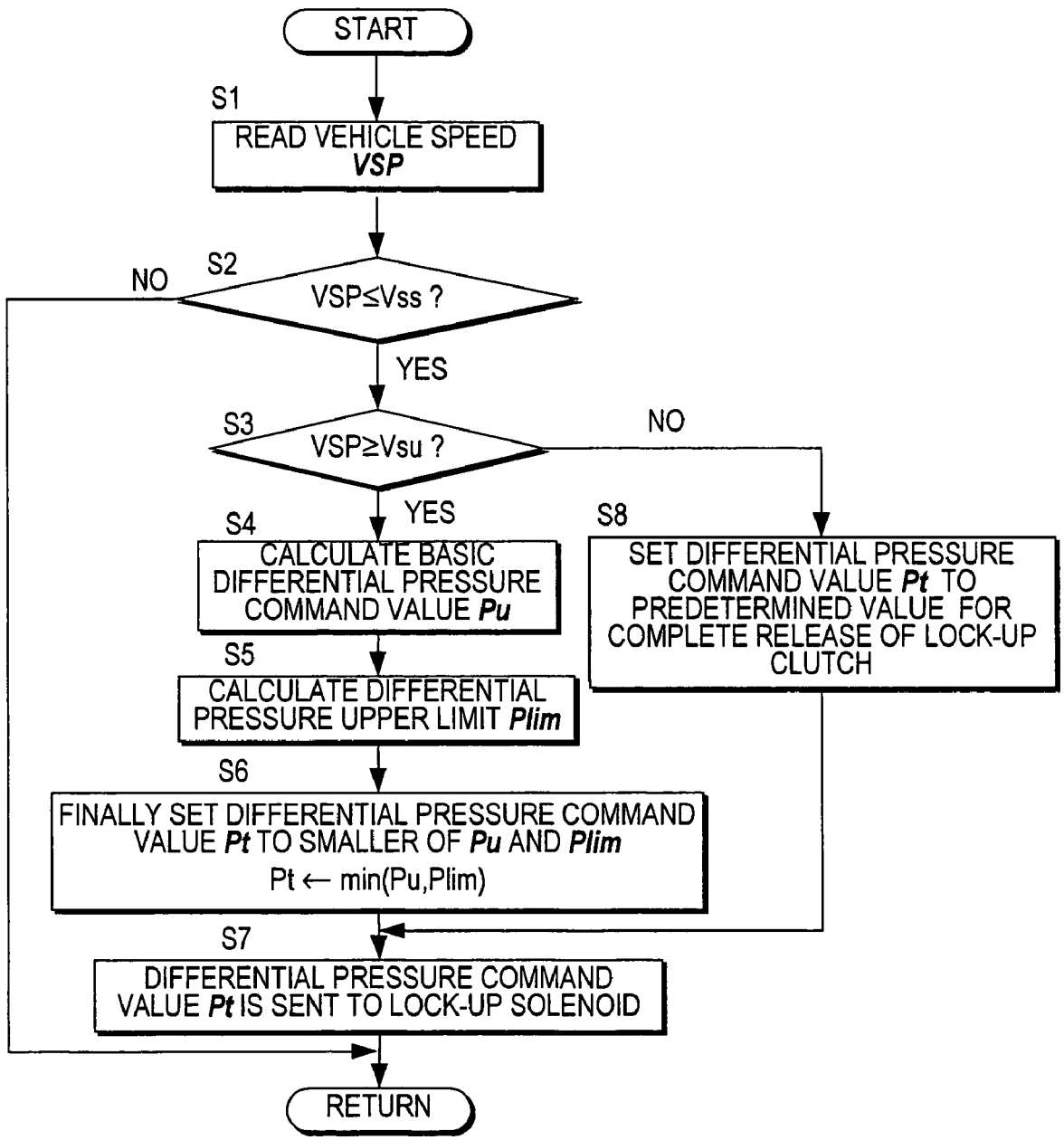
FIG. 2 is a flow chart showing a control routine performed by an AT controller according to the embodiments.

An example of a control routine, which is related to the smooth lock-up cancellation control performed by the AT controller 1, will now be explained with reference to the flow chart of FIG. 2. This control routine is repeatedly executed at a predetermined cycle (for example, several dozen msec), until lock-up cancellation is completed. The memory of the AT controller 1 stores therein maps shown hereinbelow, which is necessary for control.

The vehicle speed VSP and accelerator pedal stroke APO are read in Step S1. The vehicle speed VSP is detected by a vehicle speed sensor 13. The accelerator pedal stroke APO is detected by an accelerator pedal stroke sensor 14.

Subsequently, it is judged in Step S2 whether or not the vehicle speed VSP is the smooth lock-up cancellation start vehicle speed Vss or lower. The smooth lock-up cancellation start vehicle speed Vss is a vehicle speed at which smooth lock-up cancellation is started.

Referring to the map of FIG. 3, the smooth lock-up cancellation start vehicle speed Vss is set between the Vss2 and Vss1 on the basis of the vehicle speed VSP and the size of the accelerator pedal stroke APO.

When the vehicle speed VSP is less than or equal to the smooth lock-up cancellation start vehicle speed, smooth lock-up control is executed from Step S3 onward. On the other hand, when the vehicle speed VSP is larger than the smooth lock-up cancellation start vehicle speed Vss, the routine ends while the lock-up state is maintained.

In Step S3, a current operation range of the transmission, which is detected by the inhibitor switch 19, is read. A selection is made between the lock-up cancellation vehicle speeds VsuD (e.g. 11 km/hour) and VsuL (e.g. 10 km/hour) corresponding to an operation range of the transmission which is currently selected from the map of FIG. 3, the selected lock-up cancellation vehicle speed is read, and the selected lock-up cancellation vehicle speed is compared to a current vehicle speed VSP.

When the current vehicle speed VSP is larger than or equal to the lock-up cancellation vehicle speed Vsu (VsuD or VsuL) in Step S3, the routine proceeds to Step S4. After Step S4, lock-up cancellation control is performed mainly as slip control. In Step S4, a basic differential pressure command value Pu for cancellation (first differential pressure command value) is calculated so as to be reduced at a predetermined ramp (predetermined rate of change) such that the lock-up clutch 6 is released slowly by performing slip control. Note that this ramp is preferably a smooth gradient. The value of the predetermined rate of change may depend on the throttle valve opening TVO and may range from −0.1 to −0.4 (MPa/sec).

When the current vehicle speed VSP is less than the lock-up cancellation vehicle speed Vsu (VsuD or VsuL) in Step S3, the routine proceeds to Step S8. In Step S8, the lock-up clutch 6 is released completely to avoid engine stalling. Specifically, a differential pressure command value Pt is set to a predetermined negative value for complete release, and the lock-up clutch 6 is released immediately.

Figure 4:
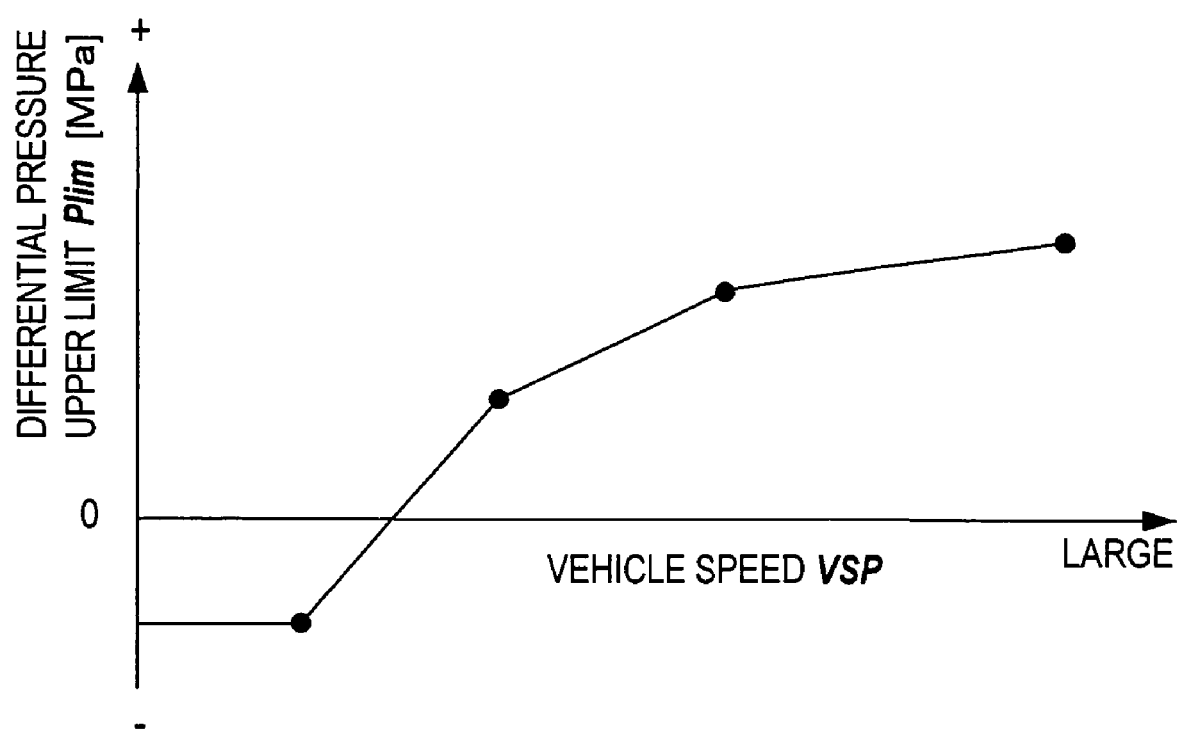
FIG. 4 is a map which specifies the relationship between a vehicle speed VSP and a differential pressure upper limit Plim.

Next, in Step S5 a differential pressure upper limit Plim (second differential pressure command value) corresponding to the current vehicle speed VSP is obtained referring to the map of FIG. 4, in order to correct the basic differential pressure command value Pu. In the map of FIG. 4, the differential pressure upper limit Plim drops as the vehicle speed VSP drops. The differential pressure upper limit Plim becomes a negative value at a vehicle speed that is lower than a predetermined vehicle speed. The negative value indicates a state where Pa<Pr is established.

Figure 5A:
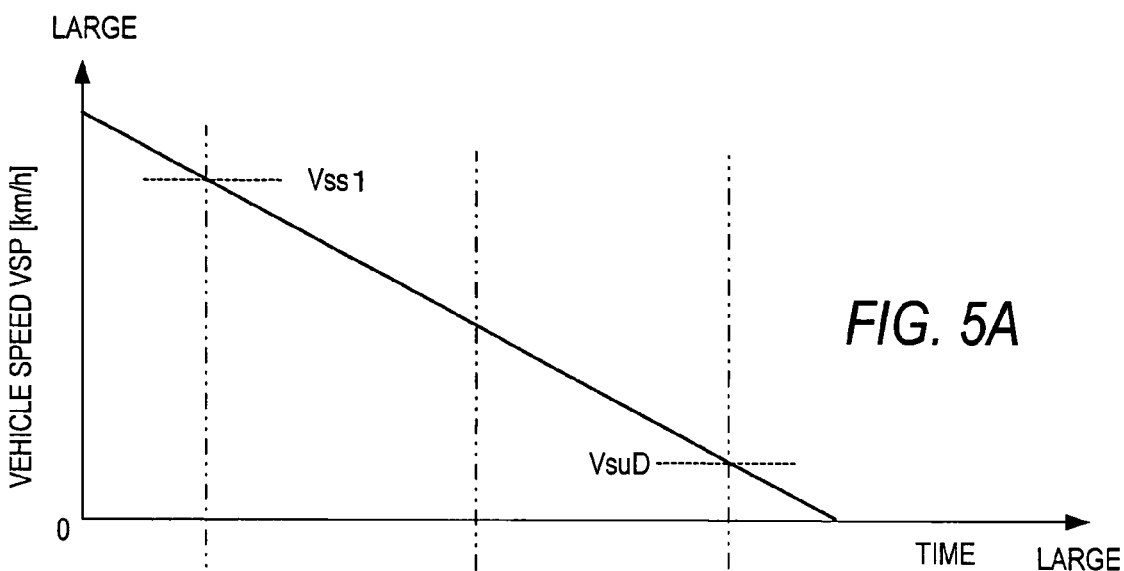
FIG. 5A is a graph showing a time variation of a vehicle speed.
Figure 5B:
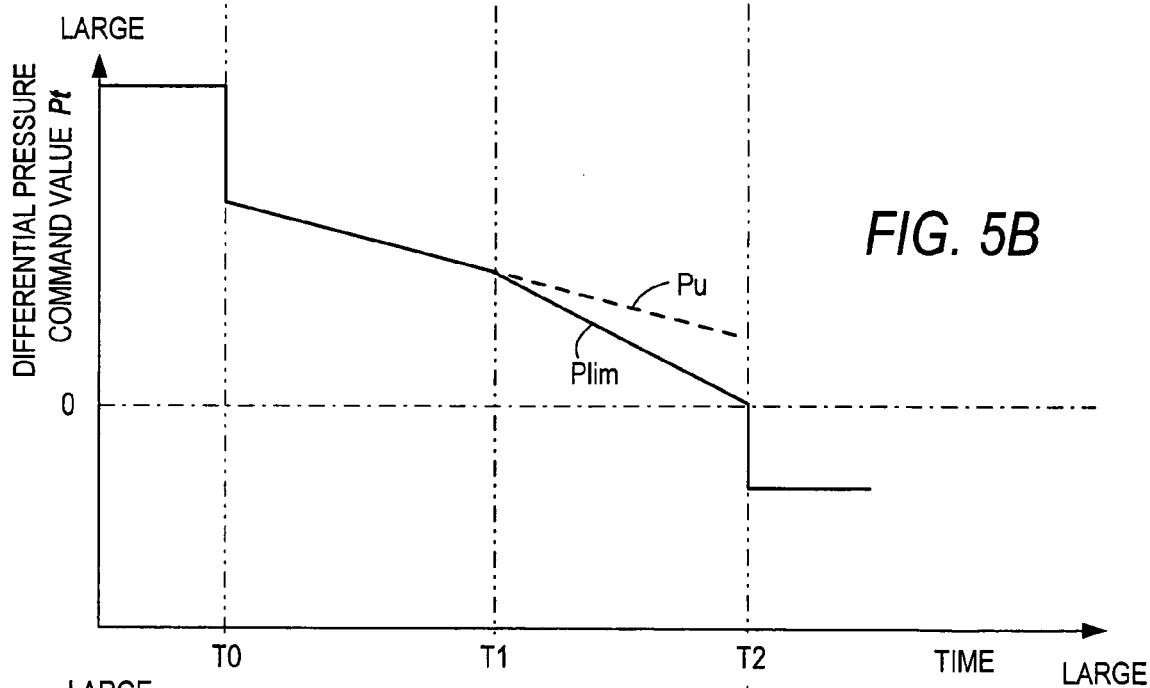
FIG. 5B is a graph showing a time variation of a differential pressure command value.

By reducing the differential pressure to a predetermined value until the vehicle speed drops to the lock-up cancellation vehicle speed Vsu (VsuD or VsuL), the differential pressure upper limit Plim prevents the occurrence of a shock generated by a fluctuation in a deceleration speed when releasing the lock-up clutch 6 as in the conventional technology. For this reason, as shown in FIG. 5B, as the vehicle speed VSP decreases, the differential pressure command value Pt is set to the differential pressure upper limit Plim, which is less than the basic differential pressure command value Pu for release, at a time T1.

Next, in Step S6, the basic differential pressure command value for release Pu obtained in Step S4 is compared to the differential pressure upper limit Plim obtained in Step S5, and the smaller one is selected and is substituted to the differential pressure command value Pt. Accordingly, the differential pressure command value Pt is set such that the differential pressure command value for release Pt does not exceed the differential pressure upper limit Plim corresponding to the vehicle speed VSP.

In Step S7 a duty ratio corresponding to the differential pressure command value Pt is sent to the lock-up solenoid 8 (i.e. to the differential pressure generator), and the lock-up solenoid 8 is driven using the duty ratio.

As described above, the differential pressure command value for cancellation Pt is set such that it does not exceed the differential pressure upper limit Plim at a vehicle speed less than or equal to the smooth lock-up cancellation start vehicle speed Vss, and the smooth lock-up cancellation control (slip control) for gradually releasing the lock-up clutch 6 is executed.

Figure 5C:
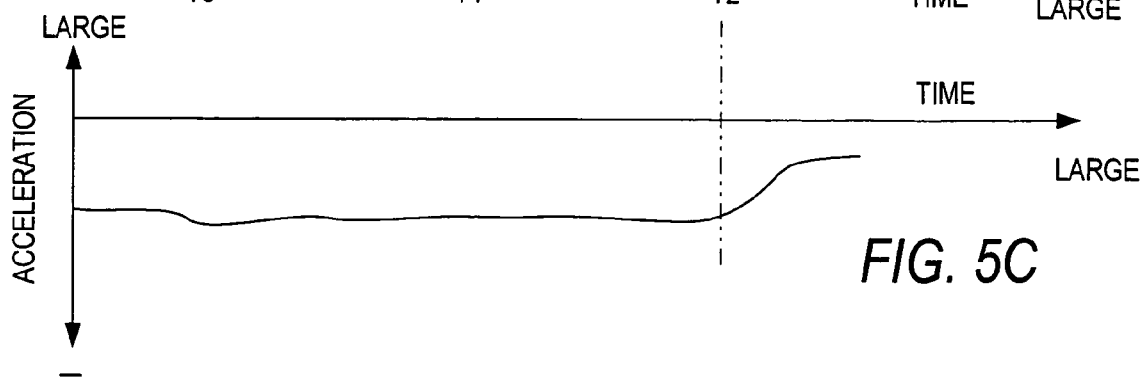
FIG. 5C is a graph showing a time variation of an acceleration of the vehicle.

Hereinbelow is explained, with reference to FIGS. 5A to 5C, a condition where the smooth lock-up cancellation control is performed when the vehicle speed is slowly reduced while the vehicle is moving in the D range.

In FIG. 5, coasting (i.e. slow deceleration) is performed in the lock-up state until a time T0. Then, at the time T0 the vehicle speed VSP reaches the smooth lock-up cancellation start vehicle speed Vss, and smooth lock-up cancellation control is started. The accelerator pedal stroke APO is % in the coasting, thus the smooth lock-up cancellation start vehicle speed Vss is the Vss1 in FIG. 3.

The differential pressure command value Pt is reduced to a predetermined value at the time T0. Thereafter, the basic differential pressure command value Pu is calculated so as to show a predetermined ramp (predetermined rate of change) in Step S4. The basic differential pressure command value Pu is obtained by the following equation: Pu=(initial value of Pu)−(|predetermined rate of change|)×(elapsed time from T0). Accordingly, the differential pressure command value Pt is gradually reduced, whereby an engaging force of the lock-up clutch 6 is gradually reduced, and the torque converter enters the slip state.

The vehicle speed VSP then gradually decreases, and, at a time T1, the basic differential pressure command value Pu for cancellation, which decreases at the predetermined ramp, exceeds the differential pressure upper limit Plim obtained in Step S6. Therefore, the differential pressure command value Pt is restricted by the differential pressure upper limit Plim. The differential pressure command value Pt to be output as a duty signal is corrected so as to be smaller than the basic differential pressure command value Pu obtained in Step S4. The differential pressure upper limit Plim decreases in accordance with the decrease of the vehicle speed VSP. As a result, the differential pressure upper limit Plim decreases as time progresses.

The vehicle speed VSP further decreases, and the vehicle speed becomes lower than the lock-up cancellation vehicle speed VsuD at a time T2. In Step S8 the differential pressure command value Pt is set to a predetermined negative value at which the lock-up clutch 6 is completely released. The lock-up clutch 6 is released immediately at the time T2, and the torque converter is shifted from the slip state to the converter state.

At a point of time of T2, the differential pressure command value Pt is already a value that is smaller than the basic differential pressure command value Pu for cancellation by being limited to the differential pressure upper limit Plim. Therefore, the deceleration of the vehicle (negative acceleration) does not change suddenly even if the lock-up clutch 6 is released completely. As shown in FIG. 5C, the deceleration decreases slowly from the time T2 onward. Consequently, the smooth lock-up cancellation control is realized in slow deceleration without the occurrence of a shock.

Hereinbelow is explained, with reference to FIG. 6, smooth lock-up cancellation control which is performed when the vehicle speed is decreased abruptly while the vehicle is moving in the D range.

Figure 6A:
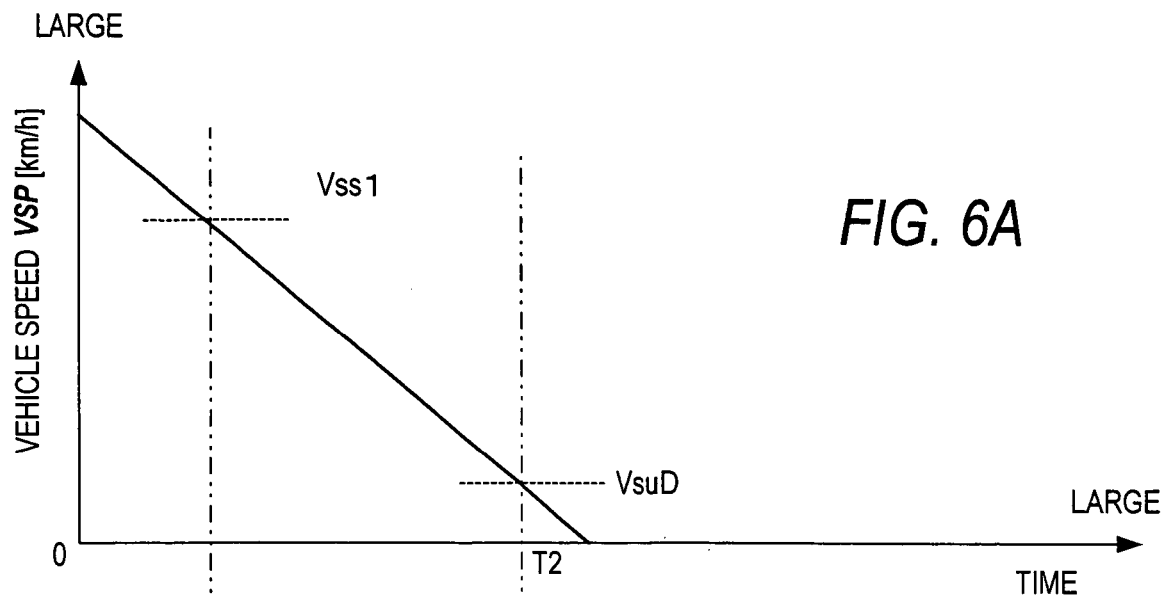
FIG. 6A is a graph showing a time variation of a vehicle speed.
Figure 6B:
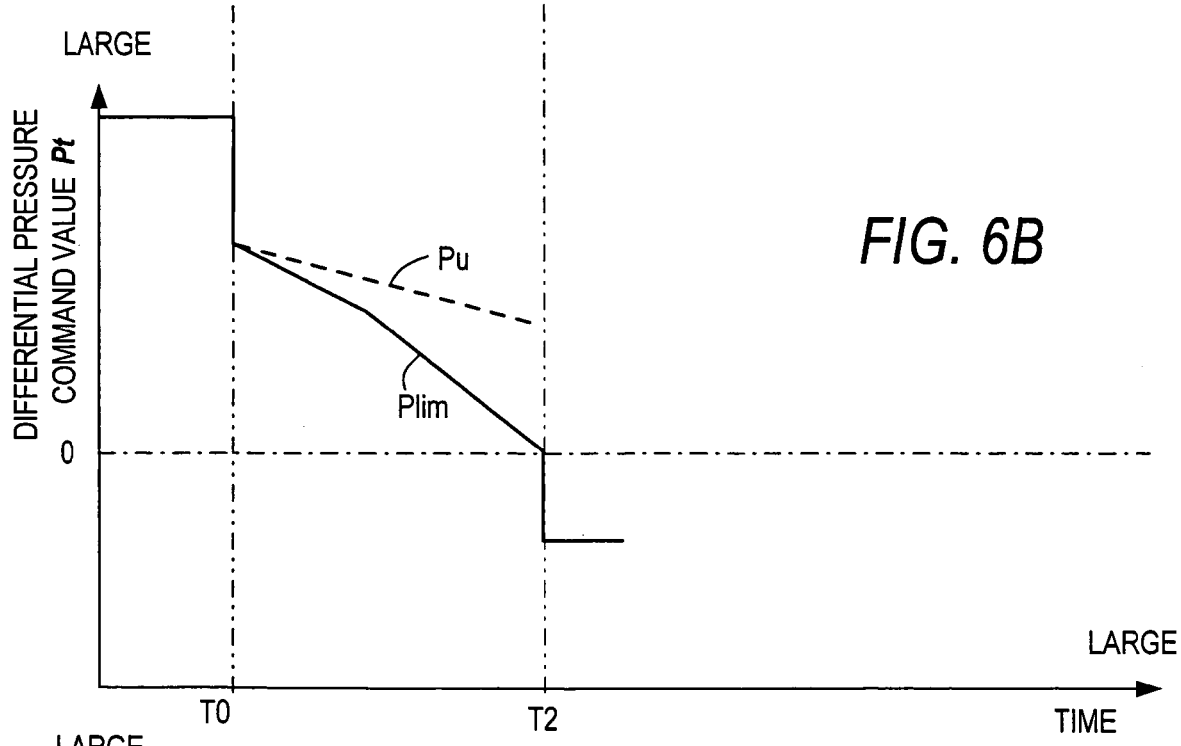
FIG. 6B is a graph showing a time variation of a differential pressure command value.

In FIG. 6, at the time T0, the vehicle speed VSP reaches the smooth lock-up cancellation start vehicle speed Vss (for example, Vss1 in FIG. 3), and smooth lock-up cancellation control is started.

The differential pressure command value Pt is reduced to a predetermined value at the time T0. Thereafter, the basic differential pressure command value Pu is calculated so as to show the predetermined ramp in Step S4. However, the vehicle speed VSP decreases rapidly due to the drastic deceleration, thus the differential pressure command value Pt is limited to the differential pressure upper limit Plim from the time T0 onward.

From then on, the differential pressure command value Pt is reduced while being restricted by the differential pressure upper limit Plim during the drastic deceleration. At the time T2, the vehicle speed VSP becomes less than the lock-up cancellation vehicle speed VsuD, and, in Step S8 the differential pressure command value Pt is set to the predetermined negative value at which the lock-up clutch 6 is released completely. Consequently, the lock-up clutch 6 is released immediately, and the torque converter is shifted from the slip state to the converter state.

As with the case of the slow deceleration, in the drastic deceleration the differential pressure command value Pt is set to a value that is smaller than the basic differential pressure command value Pu for cancellation by being limited to the differential pressure upper limit Plim, and moreover the differential pressure command value Pt is decreased to the same value of approximately zero, at the time T2, as in the slow deceleration.

Figure 6C:
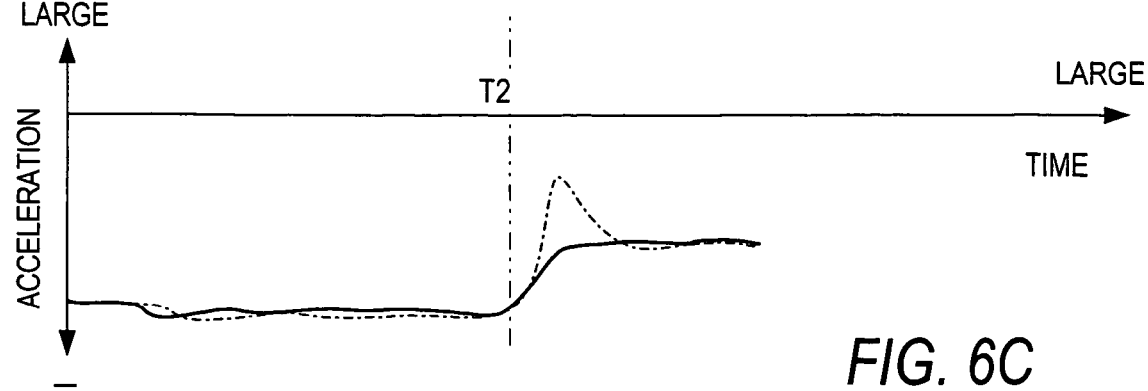
FIG. 6C is a graph showing a time variation of an acceleration of the vehicle.

At this time, the amount of deceleration of the vehicle does not change suddenly even if the lock-up clutch 6 is released completely. As the solid lines in FIG. 6C show; the deceleration decreases slowly. Accordingly, the smooth lock-up cancellation control is realized without the occurrence of a shock.

In the case of the conventional technology, on the other hand, progressive decrease of the differential pressure command value is performed in the ramp for a slow deceleration (for example, Pu indicated by the broken line in the figure). At a point of time when the lock-up cancellation vehicle speed VsuD is reached, the differential pressure is still high, thus the engaging force is large. At this point, by releasing the lock-up clutch 6 at once, an acceleration which is generated in the vehicle increases sharply after the release, as shown by the chain line in FIG. 6C, whereby a shock is generated.

Thus, according to this embodiment, the differential pressure command value Pt at the time when the vehicle speed becomes the lock-up cancellation vehicle speed VsuD (or VsuL) can be made substantially constant regardless of the scale of the deceleration of the vehicle. Furthermore, a shock is suppressed regardless of the scale of the deceleration of the vehicle, without monitoring the deceleration (or acceleration) as in the conventional technology.

Figure 7:
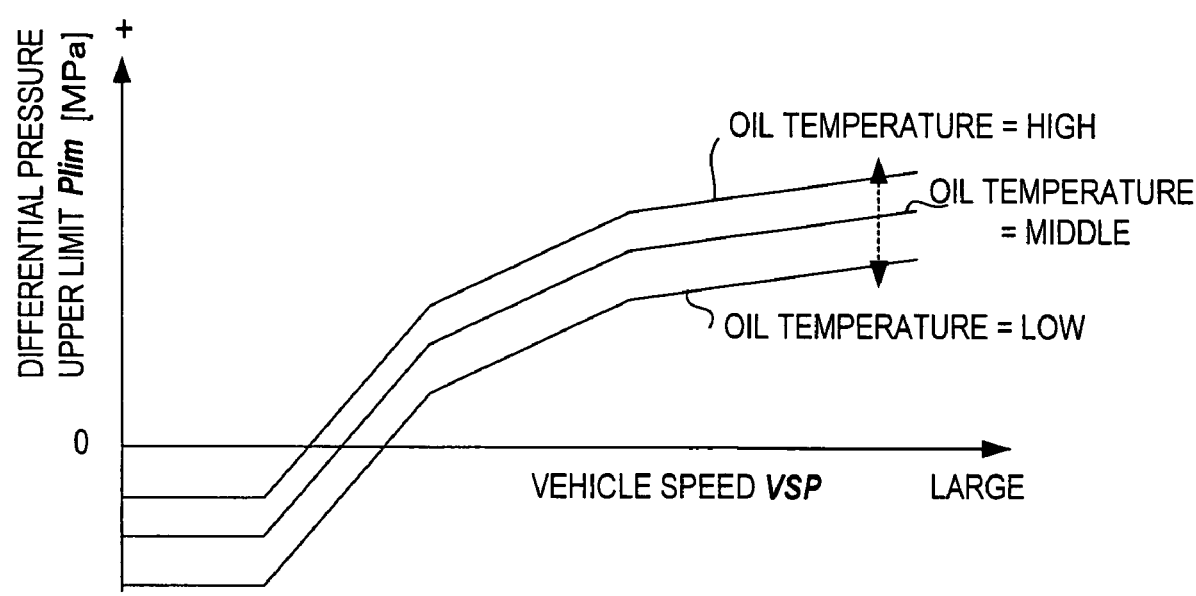
FIG. 7 is a map which specifies the relationship between a vehicle speed VSP and a differential pressure upper limit Plim for each oil temperature, and illustrates a second embodiment.

A second embodiment will now be described with reference to FIG. 7. The map of FIG. 7 sets the relationship between a vehicle speed and a differential pressure upper limit Plim in accordance with an oil temperature Tatf of the transmission 4. In Step S5, the oil temperature Tatf of the transmission 4 is detected by an oil temperature sensor 12, and furthermore the differential pressure upper limit Plim is determined on the basis of a detected oil temperature Tatf and the vehicle speed with reference to the map of FIG. 7. Other compositions of the second embodiment are same as those of the above-described first embodiment.

As the oil temperature Tatf rises, the differential pressure upper limit Plim also increases, and as the oil temperature Tatf drops, the differential pressure upper limit Plim also decreases. However, the rate of change with respect to the vehicle speed of the differential pressure upper limit Plim is same for each oil temperature.

The lower the oil temperature, the lower a response speed of the oil pressure becomes, thus, in the case of a low oil temperature, the differential pressure upper limit Plim is set lower than the standard value (for oil temperature=medium) for the whole vehicle speed. The higher the oil temperature, the higher the response speed of the oil pressure becomes, thus, in the case of a high temperature, the differential pressure upper limit value Plim is set higher than the standard value (for oil temperature=medium) for the whole vehicle speed. Accordingly, a delay of the response of the oil pressure due to a change in the oil temperature Tatf is canceled.

A third embodiment will now be described with reference to the map of FIG. 8. The map of FIG. 8 sets the relationship between a vehicle speed and a differential pressure upper limit Plim in accordance with the scale of the lock-up cancellation vehicle speed VsuD or VsuL. In Step S5, the differential pressure upper limit Plim is determined on the basis of the lock-up cancellation vehicle speed and the vehicle speed with reference to the map of FIG. 8. Other compositions of the third embodiment are same as those of the first embodiment.

Figure 8:
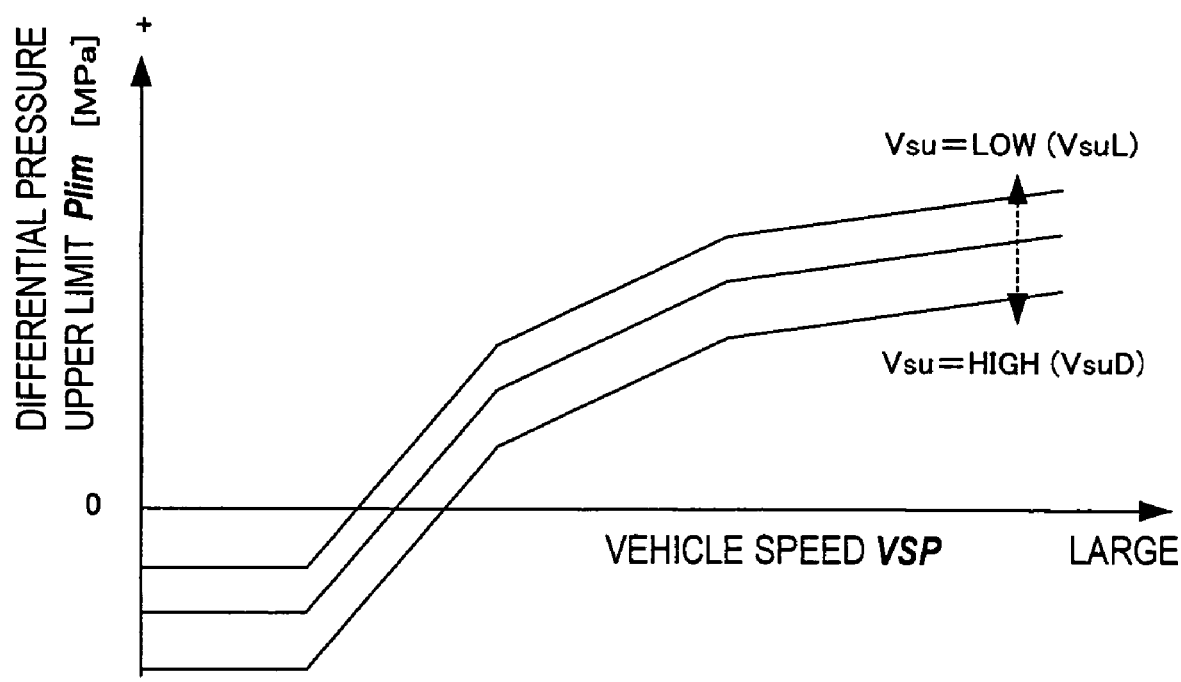
FIG. 8 is a map which specifies the relationship between the vehicle speed VSP and the differential pressure upper limit Plim for each lock-up cancellation vehicle speed, and illustrates a third embodiment.

The map of FIG. 8 sets the relationship between a vehicle speed and a differential pressure upper limit Plim in response to the lock-up cancellation vehicle speed Vsu. The lower the lock-up cancellation vehicle speed, the higher the differential pressure upper limit Plim, and the higher the lock-up cancellation vehicle speed, the lower the differential pressure upper limit Plim.

In the case where the lock-up cancellation vehicle speed is low, it is when the lock-up cancellation vehicle speed is the VsuL in FIG. 3, for example. In this case, the difference between the lock-up cancellation start vehicle speed Vss and the lock-up cancellation vehicle speed is large. Hence, even if smooth lock-up cancellation control is performed at a high differential pressure upper limit Plim from the lock-up cancellation start vehicle speed Vss, the differential pressure command value Pt is already decreased sufficiently by the time when the lock-up cancellation vehicle speed VsuL is reached. Therefore, the smooth lock-up cancellation control is realized smoothly without the occurrence of a shock.

In the case where the lock-up cancellation vehicle speed is high, it is when the lock-up cancellation vehicle speed is the VsuD in FIG. 3. In this case, the difference between the lock-up cancellation start vehicle speed Vss and the lock-up cancellation vehicle speed is small. Hence, if the smooth lock-up cancellation control is not performed at a low differential pressure upper limit Plim from the lock-up cancellation start vehicle speed Vss, the differential pressure command value Pt does not decrease sufficiently at the time when the lock-up cancellation vehicle speed VsuL is reached. Therefore, when the lock-up cancellation vehicle speed is high, the differential pressure upper limit Plim is set low in order to prevent a shock.

A fourth embodiment will now be described with reference to FIG. 9. The map of FIG. 9 sets the relationship between a vehicle speed and a differential pressure upper limit Plim in accordance with the magnitude of the engine torque (i.e. an input torque to the torque converter 5). In Step S5 the differential pressure upper limit Plim is determined on the basis of the engine torque and the vehicle speed with reference to the map of FIG. 9. Other compositions of the fourth embodiment are same as those of the first embodiment.

Figure 9:
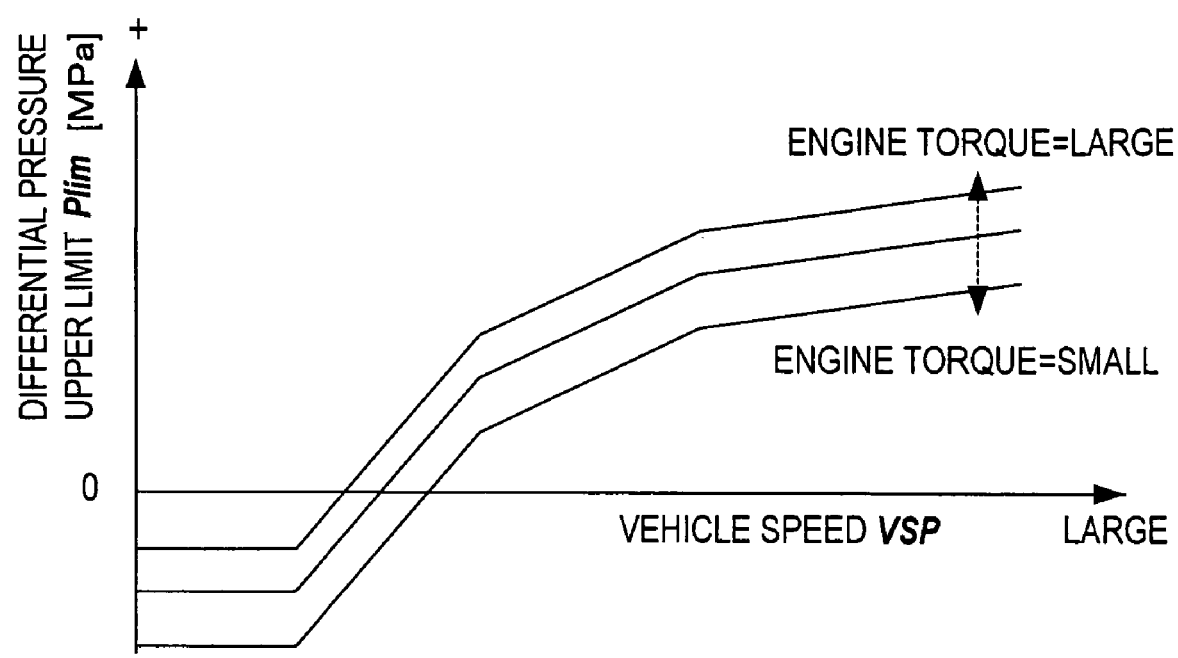
FIG. 9 is a map which specifies the relationship between vehicle speed VSP and the differential pressure upper limit Plim for each engine torque, and illustrates a fourth embodiment.

The map of FIG. 9 is set for each engine torque Te which is received from an engine controller 2 or calculated by the AT controller 1 from an engine speed Ne and the accelerator pedal stroke APO. The larger the engine torque, the higher the differential pressure upper limit Plim, and the smaller the engine torque, the lower the differential pressure upper limit Plim.

When the engine torque is big, slippage of the lock-up clutch 6 occurs in an early stage when performing lock-up cancellation, thus the differential pressure upper limit Plim is set high so that the slippage does not become excessive. However, when the engine torque is low, there is caused a delay in the occurrence of slippage during the lock-up cancellation. Therefore, at a low engine torque, even when performing the smooth lock-up cancellation control at a low differential pressure upper limit Plim, the slippage does not become excessive.

According to the first to fourth embodiments, by decreasing the basic differential pressure command value Pu at a predetermined rate of change, the engaged lock-up clutch is gradually released. After the vehicle speed becomes a predetermined smooth lock-up cancellation start vehicle speed Vss (first vehicle speed), at a time T1 of FIG. 5, the differential pressure command value is set to the differential pressure upper limit Plim (second differential pressure command value), which is smaller than the basic differential pressure command value Pu for cancellation (first differential pressure command value). Therefore, by the time when the lock-up cancellation vehicle speed Vsu (VsuD or VsuL) (second vehicle speed) is reached, the differential pressure command value can be set sufficiently low, and, regardless of the scale of the deceleration speed, can be set substantially constant. A shock which occurs at a time of complete release is suppressed regardless of the scale of the deceleration speed, and the lock-up clutch is released smoothly.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-103720 (filed Mar. 31, 2004) are incorporated herein by reference.

What is claimed is:

1. A lock-up clutch control device which controls a lock-up clutch provided in a torque converter which is mounted between an engine and a transmission provided in a vehicle, the lock-up clutch control device switching between a converter state and a lock-up state of the torque converter by controlling a differential pressure supplied to the lock-up clutch, the lock-up clutch control device comprising:
 a sensor which detects a vehicle speed;
 a differential pressure generator which generates the differential pressure supplied to the lock-up clutch in response to an operational differential pressure command value; and
 a controller programmed to:
  calculate a first differential pressure command value which decreases at a predetermined rate of change, after the detected vehicle speed becomes a first predetermined vehicle speed;
  calculate a second differential pressure command value which is smaller than the first differential pressure command value;
  set the operational differential pressure command value for the differential pressure generator to the second differential pressure command value, before the detected vehicle speed becomes a second predetermined vehicle speed which is lower than the first predetermined vehicle speed; and
  set the operational differential pressure command value for the differential pressure generator to a value at which the lock-up clutch is immediately released, when the detected vehicle speed becomes the second predetermined vehicle speed.

2. The control device as defined in claim 1, wherein a differential pressure upper limit, which decreases as the detected vehicle speed decreases, comprises the second differential pressure command value, and
wherein the controller is programmed to:
calculate the differential pressure upper limit on the basis of the detected vehicle speed;
compare the first differential pressure command value to the differential pressure upper limit; and
set the differential pressure command value to a smaller one of the first differential pressure command value and the differential pressure upper limit.

3. The control device as defined in claim 2, wherein
the controller comprises a map which specifies a relationship between the vehicle speed and the differential pressure upper limit, and
the controller is programmed to:
calculate the differential pressure upper limit in accordance with the detected vehicle speed with reference to the map.

4. The control device as defined in claim 2, further comprising an oil temperature sensor which detects an oil temperature of the transmission, wherein the controller is programmed to:
calculate the differential pressure upper limit in accordance with the detected oil temperature.

5. The control device as defined in claim 4, wherein
the controller comprises a map which specifies a relationship between the vehicle speed and the differential pressure upper limit in accordance with the oil temperature, and
the controller is programmed to:
calculate the differential pressure upper limit in accordance with the detected oil temperature and the detected vehicle speed with reference to the map.

6. The control device as defined in claim 2, further comprising a sensor which detects an operation range of the transmission, wherein:
the second predetermined vehicle speed is set in advance for each operation range of the transmission and is stored in the controller; and
the controller is programmed to calculate the differential pressure upper limit in accordance with the detected operation range.

7. The control device as defined in claim 2, further comprising means to detect an input torque to the torque converter, wherein the controller is programmed to:
calculate the differential pressure upper limit in accordance with the detected input torque.

8. The control device as defined in claim 7, wherein
the controller comprises a map which specifies a relationship between the vehicle speed and the differential pressure upper limit in accordance with the input torque to the torque converter, and
the controller is programmed to:
calculate the differential pressure upper limit in accordance with the detected input torque and detected vehicle speed with reference to the map.

9. A lock-up clutch control device which controls a lock-up clutch provided in a torque converter which is mounted between an engine and a transmission provided in a vehicle, the lock-up clutch control device switching between a converter state and a lock-up state of the torque converter by controlling a differential pressure supplied to the lock-up clutch, the lock-up clutch control device comprising:
detecting means for detecting a vehicle speed;
differential pressure generating means for generating the differential pressure supplied to the lock-up clutch in response to an operational differential pressure command value;
calculating means for calculating a first differential pressure command value which decreases at a predetermined rate of change, after the detected vehicle speed becomes a first predetermined vehicle speed;
calculating means for calculating a second differential pressure command value which is smaller than the first differential pressure command value;
setting means for setting the operational differential pressure command value for the differential pressure generating means to the second differential pressure command value, before the detected vehicle speed becomes a second predetermined vehicle speed which is lower than the first predetermined vehicle speed; and
setting means for setting the operational differential pressure command value for the differential pressure generating means to a value at which the lock-up clutch is immediately released, when the detected vehicle speed becomes the second predetermined vehicle speed.

10. A lock-up clutch control method for controlling a lock-up clutch provided in a torque converter which is mounted between an engine and a transmission provided in a vehicle, a state of the torque converter is switched between a converter state and a lock-up state by a control of a differential pressure supplied to the lock-up clutch, the lock-up clutch control method comprising:
detecting a vehicle speed;
calculating a first differential pressure command value which decreases at a predetermined rate of change, after the detected vehicle speed becomes a first predetermined vehicle speed;
calculating a second differential pressure command value which is smaller than the first differential pressure command value;
setting an operational differential pressure command value for a differential pressure generator to the second differential pressure command value, before the detected vehicle speed becomes a second predetermined vehicle speed which is lower than the first predetermined vehicle speed; wherein the differential pressure generator generates the differential pressure supplied to the lock-up clutch in response to the operational differential pressure command value for the differential pressure generator; and
setting the operational differential pressure command value for the differential pressure generator to a value at which the lock-up clutch is immediately released, when the detected vehicle speed becomes the second predetermined vehicle speed.

* * * * *